UNITED STATES PATENT OFFICE.

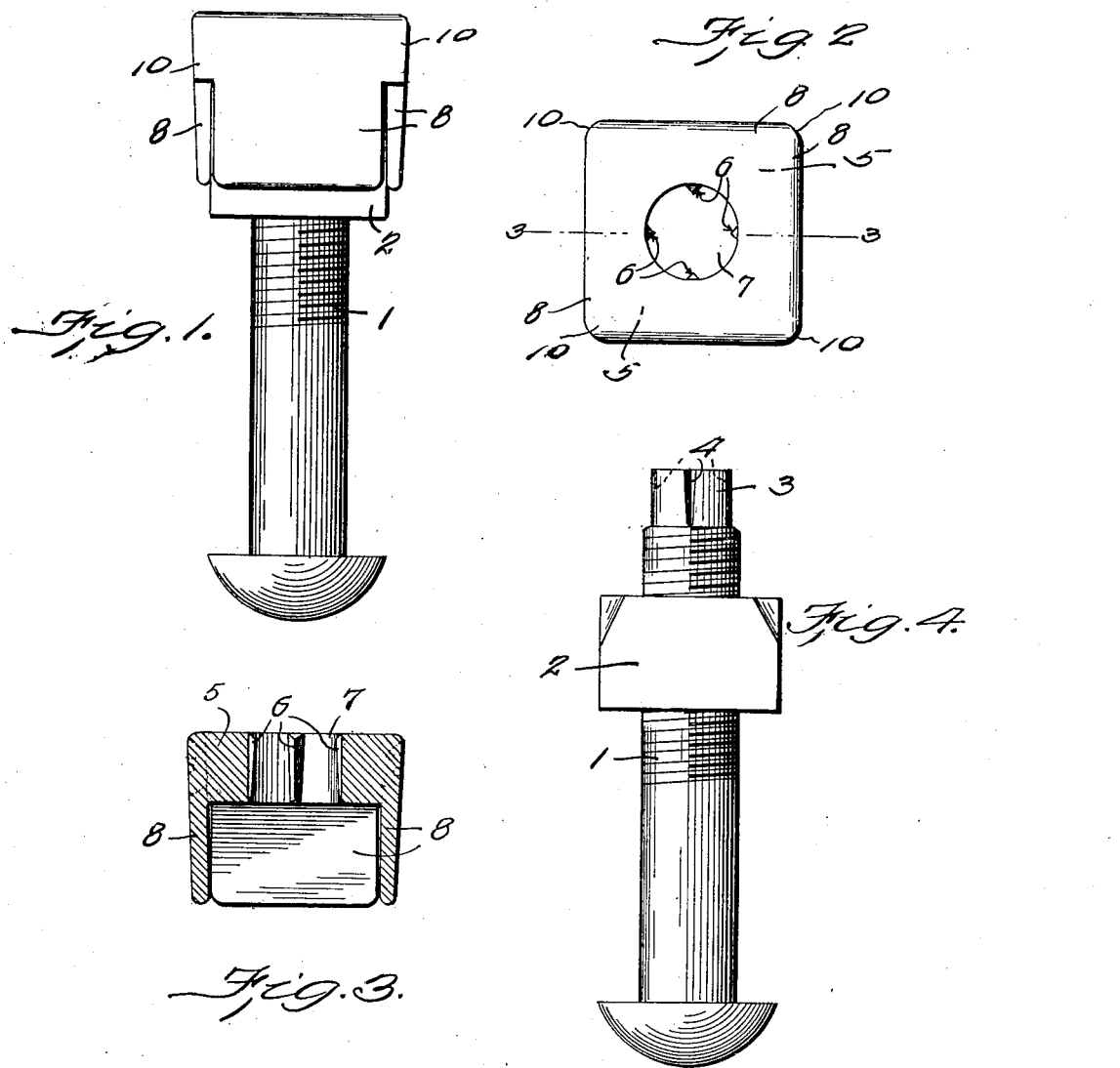

JOHN W. CURTIN, OF WORCESTER, MASSACHUSETTS.

NUT-LOCK.

1,352,053.  Specification of Letters Patent.  Patented Sept. 7, 1920.

Application filed October 2, 1919. Serial No. 327,881.

*To all whom it may concern:*

Be it known that I, JOHN W. CURTIN, a citizen of the United States, residing at Worcester, in the county of Worcester and State of Massachusetts, have invented a new and useful Nut-Lock, of which the following is a specification.

The object of my invention is to provide an improved device for securely locking a nut on a bolt without injuring the thread on the bolt. I attain the objects of my invention by the device illustrated in the accompanying drawings, in which—

Figure 1 is a side elevation of the invention;

Fig. 2 is a top plan;

Fig. 3 is a section on line 3—3 of Fig. 2; and

Fig. 4 is a side elevation of the device disassembled after one of my nut locks has been applied to a bolt and then removed, leaving the grooves 4.

Like numerals designate like parts in each of the views.

Referring to the drawings, I provide a top plate 5 having a circular opening 7, into which project inwardly tapering ribs 6. Suitably secured to top plate 5 I provide the integral side plates 8 shown in Fig. 3, and which have flanges 10 onto the opposed plates, as shown in Figs. 1 and 2. The angular cap device formed by members 5 and 8, as shown in Fig. 3 is adapted to engage over the nut 2 of bolt 1, the sides 8 projecting over the sides of the bolt while the ribs 6 engage the blank end of the bolt and cut the grooves 4, thus forming a lock, which can however be removed and applied again when the bolt is in a different position on the nut.

When the cap device has been applied to a nut and bolt, its ribs 6 seat on the blank end of the bolt, cutting the grooves 4 of the bolt and the sides 8 engage the sides of the nut 2, thereby preventing any chance of the lock working loose while at the same time not interfering with the threading of the bolt nor preventing its subsequent use. The bolt is made blank at the end, as shown in Fig. 4 so as not to interfere with the thread on the bolt nor injure same. After the nut is screwed on and placed where wanted, the cap device or nut lock described above is hammered on over the nut and holds it in place securely locked. The lock can be pried off without injury to either lock or nut and bolt can be used again repeatedly. The device may be applied to any size of nut and bolt.

What I claim is:

In a device for locking a nut of ordinary construction on a bolt, the combination of a threaded bolt, having a blank end, and a locking cap device comprising a head having a central channel of suitable size to seat over the blank end of the bolt, said channel having projecting inwardly tapering ribs adapted to cut grooves in a locking device on the blank end of the bolt, and side plates integral with the aforesaid head and adapted to engage over the sides of the nut and lock same in any position desired on the bolt.

JOHN W. CURTIN.